May 28, 1968  W. A. RAMSEY ET AL  3,385,244
ELECTRONIC CONTROL SYSTEM FOR AUTOMATED
SEWING MACHINE APPARATUS
Filed Oct. 31, 1966  4 Sheets-Sheet 2
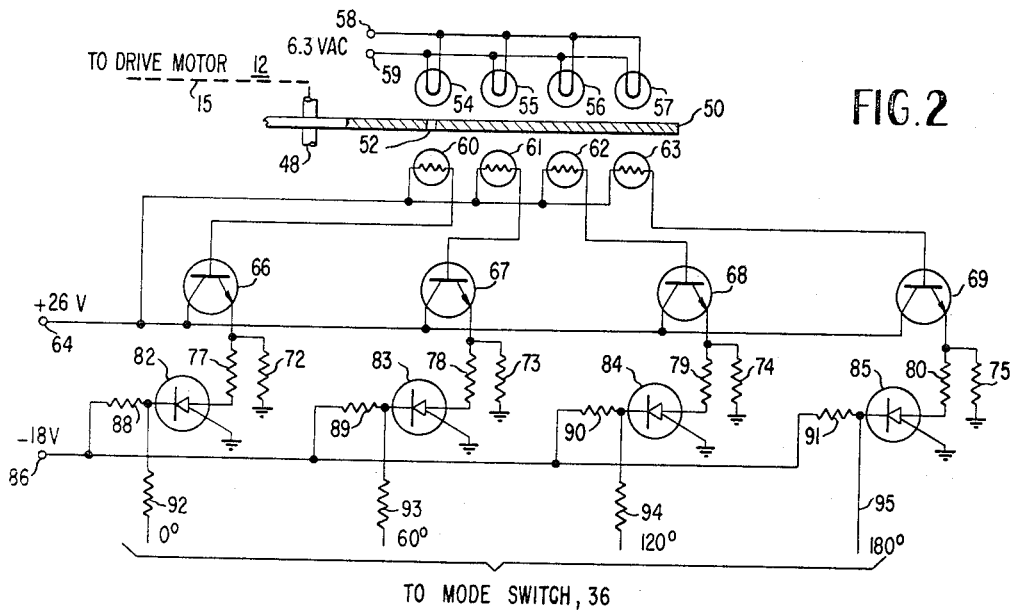
FIG.2
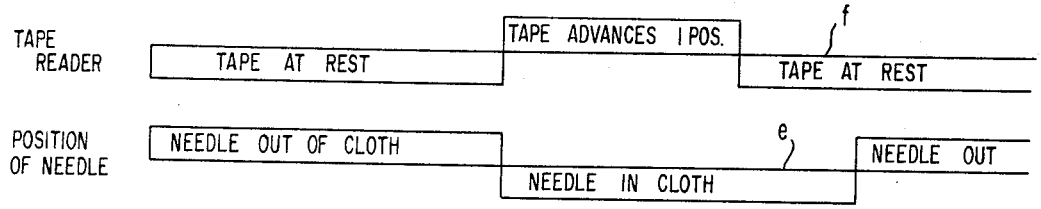
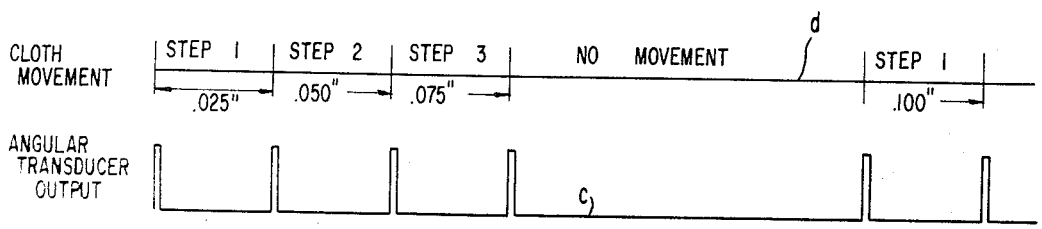
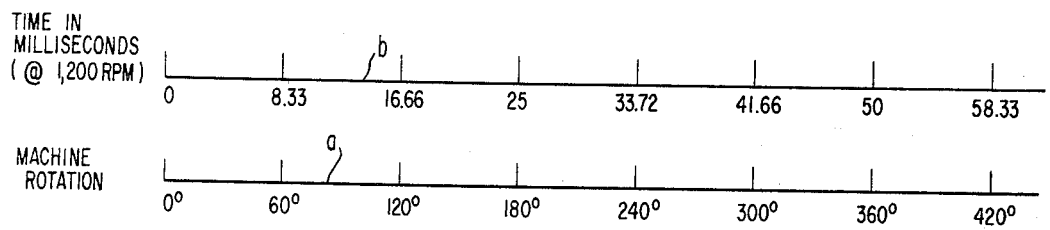
FIG.3

United States Patent Office 3,385,244
Patented May 28, 1968

3,385,244
ELECTRONIC CONTROL SYSTEM FOR AUTO-
MATED SEWING MACHINE APPARATUS
Willard A. Ramsey and Jerry M. Minchey, Greenville,
S.C., assignors to Her Majesty Underwear Company,
Mauldin, S.C., a corporation of South Carolina
Filed Oct. 31, 1966, Ser. No. 590,641
13 Claims. (Cl. 112—2)

This invention relates to electronic control systems in general and more particularly to a high speed digital electronic control system for sewing machine apparatus and the like where it is desirable to operate one or more sewing machines in accordance with a prerecorded program.

Automatic control systems for machine tool operations and the like are well-known to those skilled in the art. In such systems, a programmer, for example a perforated tape reader or a computer memory, is used to feed command signals to control the various operations necessary in carrying out the desired functions. In sewing operations, however, there exists a problem which is unique in that any relative motion between the sewing head and the workpiece must be made during the time in which the needle is out of the workpiece which may be, for example, a piece of cloth or other fabric. Where high stitching rates are encountered, e.g., 1200 stitches per minute, the time in which the needle is out of the fabric during each cycle is approximately 25 milliseconds. In addition, the problem is further complicated by the fact that in order to sew a seam with a smooth contour, it is necessary to break down the motion into increments shorter than the desired stitch length. This necessitates several discrete, measured movements while the needle is out of the fabric to form a complete stitch. Another problem exists due to the fact that a greater distance must be covered during the short time in which the needle is out of the fabric than is necessary with an ordinary numerical control system. This requires more power per unit of weight moved than most numerical control applications because the work must be accelerated to a higher velocity and decelerated to a stop each time the machine makes a stitch.

It is an object of the present invention, therefore, to provide an improved electronic control system for sewing machine apparatus which exhibits high sewing speeds while requiring relatively fewer moving parts.

Another object of the present invention is to provide a control system for sewing machines and the like in which the work is moved relative to the sewing head in X and Y rectangular coordinate directions.

It is yet another object of the present invention to provide an automated sewing machine which is adapted to be controlled by a high speed programmer such as a perforated tape reader.

Still another object of the present invention is to provide an electronic control system for sewing machines and the like where the work is moved under the control of a recorded program along perpendicular axes relative to the sewing head each time the needle is in the sewing head is out of the work.

Briefly, the subject invention contemplates coupling electrical step motors to a work frame, such as a cloth frame, to supply a controlled intermittent step motion in both an X and a Y coordinate axis with respect to a sewing machine head each time the needle in the sewing machine head is out of the cloth during each stitching cycle. The motion of the cloth frame is controlled by means of a perforated tape reader which feeds electrical signals into an X and Y logic circuit. A timing means is also coupled thereto for supplying enabling gates which allow command signals to be coupled to the step motors at selected times during which the needle is out of the cloth. For example, the present invention is adapted to step in either the X or Y direction several times in response to information fed from the tape reader during each stitching cycle.

Other objects and advantages of the present invention will become more apparent as the following detailed description is read in conjunction with the following drawings wherein like reference characters are employed to designate like parts throughout the same:

FIGURE 2 is a schematic diagram illustrative of the timing means utilized by the subject invention and comprises an angular transducer shown in FIGURE 1;

FIGURE 3 is a timing diagram helpful in understanding operation of the present invention;

Figure 1:
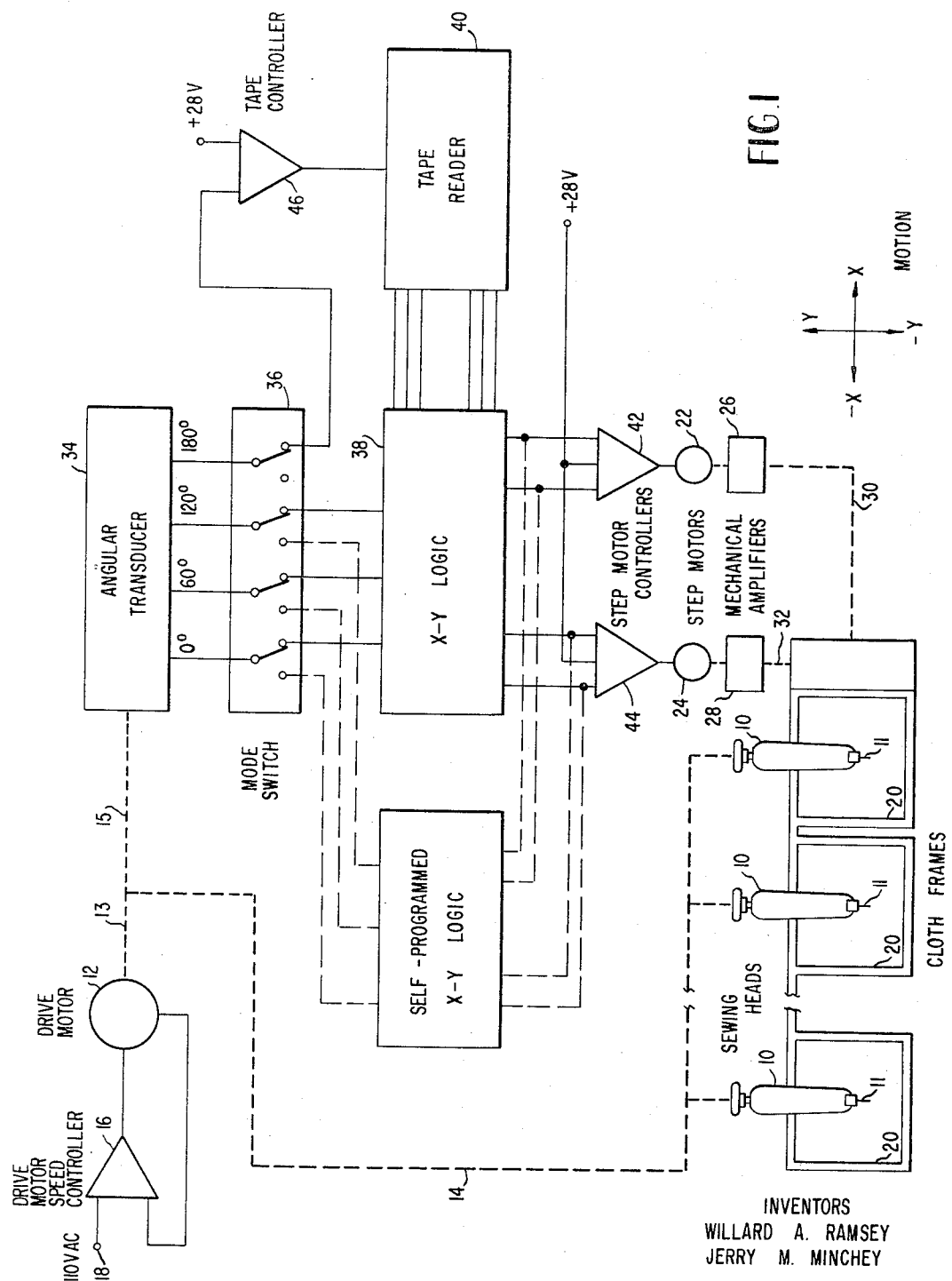
FIGURE 1 is a block diagrammatic representation of a preferred embodiment of the subject invention.

Directing attention now more particularly to the drawings, in FIGURE 1 there is shown a plurality of sewing heads 10 including respective sewing needles 11 mechanically coupled to the shaft 13 (shown schematically) of an electric drive motor 12 by means of a mechanical linkage 14 also shown schematically. The drive motor 12 is adapted to be controlled by means of a speed controller 16 which is coupled to a source of AC line voltage at terminal 18. A plurality of cloth or fabric frames 20 are mechanically linked together under respective sewing heads 10 and are adapted to move back and forth along rectangular coordinate (X and Y) axes in a plane normal to the motion of the heads 10. This motion is effected by step motors 22 and 24 which are coupled to the cloth frames 20 by means of the mechanical amplifiers 26 and 28 and the mechanical linkages 30 and 32.

Also coupled to the shaft 13 of the drive motor 12 is a timing means comprising an angular transducer 34 which is adapted to produce enabling signals at selected angular positions of the shaft 13 of the drive motor 12 such that enabling pulses are produced at 0°, 60°, 120° and 180° or during one-half of a complete revolution of the drive motor 12. The outputs of the angular transducers 34 are coupled to a mode switch 36 whereupon three outputs corresponding to 0°, 60° and 120° are fed to an X–Y logic circuit 38. The mode switch 36, moreover, is adapted to convert the subject system from a predetermined pattern control to a self-programming system which is the subject of a copending application entitled Electronic Control System for a Self-Programming Sewing Machine Apparatus, Ser. No. 590,669, filed Oct. 31, 1966.

In the instant invention, a perforated tape reader 40 is coupled to the X–Y logic circuit 38 for feeding control information thereto from a perforated tape, not shown. The tape reader 40 is coupled to a controller 42 which has an input applied thereto from the angular transducer 34 by means of the mode switch 36 and corresponds to an enabling signal at 180°. The purpose of this signal will be explained subsequently. Also a DC voltage (+28 volts) is applied to the input of the controller 42 for providing a supply voltage.

As noted, the X–Y logic circuitry 38 receives inputs from the angular transducer 34 in the nature of enabling or timing pulses, while at the same time, receiving information from the tape reader 40 which are in the nature of control pulses for directing the movement of the cloth frames 20. The output of the X–Y logic circuitry 38 is applied to the step motors 22 and 24 through the step motor controllers 42 and 44, respectively, to drive the motors either in a clockwise or a counter-clockwise direction depending upon the nature of the command signals received from the logic circuitry 38. The motion of the step motors when applied to the mechanical amplifiers 26 and 28 will drive the cloth frames 20 along X–Y coordinate axes by means of the linkage 32 which may be, for example, a lead screw mechanism.

The block diagram in FIGURE 1 discloses a system for automatically sewing a predetermined pattern by means of a tape reader 40 which feeds the pattern information into the X–Y logic circuitry 38 which is controlled by means of the angular transducer 34 to receive three enabling pulses during each stitching cycle when the needles 11 in the sewing head 10 are out of the cloth or fabric. For example, when the shaft of the drive motor 12 is at a reference point corresponding to 0°, an enabling signal is applied to the X–Y logic circuitry 38 which generates a command voltage for the step motors 22 and 24 in accordance with the information fed from the tape reader 40 to advance or back-up a predetermined step distance. This operation is adapted to occur again at the 60° angular position and the 120° angular position. Thus, three discrete steps can be made in either direction along the X and Y axes during each stitching cycle or revolution of the shaft of the drive motor 12. At the 180° angular position, an enabling pulse is fed from the angular transducer 34 through the mode switch 36 to the tape controller 42 which is used to advance the tape reader for the succeeding cycle.

In other words, for one-half revolution of the drive motor 12 which corresponds to one-half of a stitch cycle, a needle 11 is out of its respective cloth frame 20 and the step motors 22 and 24 can step the cloth frame three distinct steps prior to the needle in the sewing heads again entering the work cloth. It should be pointed out that this is stated by way of example only and is not meant to be interpreted in a limiting sense the reason being that by selectively choosing the design of the mechanical amplifiers 26 and 28, higher stepping rates will permit more steps to be taken when the needle is out of the cloth allowing more and shorter increments of movement per stitch. Thus, it may be possible to step the frames every 10 or 30° rather than 60° as presently illustrated.

Considering the invention now in even greater detail, attention is directed to FIGURE 2 which illustrates the embodiment of the angular transducer 34 shown in FIGURE 1. There is shown a mechanical coupling 15 to the drive shaft 13 of the drive motor 12 shown in FIG. 1 which is coupled to the spindle 48 of a perforated disc 50. The disc 50 is adapted to have four openings 52 therein at selected angular positions. Electric light means 54 are placed on one side of the disc 50 and are adapted to be powered by means of a small voltage (6.3 volts AC) applied across terminals 58 and 59. On the opposite side of the perforated disc are four photoelectric elements 60, 61, 62 and 63 which are adapted to be respectively illuminated by the lights 54, 55, 56 and 57 as the disc 50 rotates. The holes are located in the disc such that photoelectric element 60 receives light from light 54 at a point where the needle 11 in the sewing head 10 just clears the cloth. This angular position is defined as 0°. Holes, not shown, are placed in the disc 50 such that photoelectric element 61 receives light at an angular position of 60°, photoelectric element 62 receives light at the 120° position and, finally, the photoelectric element 63 receives light at the 180° position. One side of the photoelectric elements 61–63 is coupled to a positive voltage source (+26 volts) applied to terminal 64 while the opposite terminals thereof are respectively coupled to the bases of transistors 66, 67, 68 and 69. The collector electrodes of the transistors 66 through 69 are also commonly connected to the +26 volts applied to terminal 64. The emitter of transistor 66 is returned to ground through resistor 72. Likewise transistors 67, 68 and 69 have their respective emitters coupled to ground through resistors 73, 74 and 75. Each of these configurations provides what is known to those skilled in the art as an emitter follower circuit. Also coupled to the emitter of transistor 66 is a second resistor 77 which is connected to the anode electrode of a controlled rectifier 82. Similarly, the emitters of transistors 67–69 are coupled to anodes of respective controlled rectifiers 83, 84 and 85 by means of resistors 78, 79 and 80. The cathode electrodes of the controlled rectifiers 82, 83, 84 and 85 are returned to a source of negative potential (−18 volts) by means of resistors 88, 89, 90 and 91 coupled to terminal 86. Resistors 92, 93 and 94 are coupled from the cathodes of controlled rectifiers 82, 83 and 84 to the mode switch 36 as shown in FIGURE 1. Circuit lead 95, however, directly connects the cathode of controlled rectifier 85 to the mode switch 36.

In operation, the perforated disc 50 rotates one revolution per sewing cycle as provided for by drive motor 15. Photoelectric elements 60, 61, 62, 63 are sequentially illuminated by respective light means 54, 55, 56 and 57 at angular positions corresponding to 0°, 60°, 120° and 180° of the sewing cycle. When photoelectric element 60 is illuminated at the 0° position, transistor 66 is rendered conductive by means of the base current supplied thereto by means of the change of resistance of the photoelectric element. The turning on of the transistor 66 produces a signal across the emitter resistor 72 which is sensed at the anode of the controlled rectifier 82 by means of the resistor 77, also rendering it conductive. When the controlled rectifier 82 turns on, an enabling signal is produced across the resistor 88 which is positive going due to the fact that the cathode is supplied from a −18 volt supply. This enabling signal is then coupled to the mode switch 36 shown in FIGURE 1 by means of the resistor 92. Likewise, enabling signals are produced at the cathodes of controlled rectifiers 83, 84 and 85 when the respective photoelectric elements 61, 62 and 63 are energized.

FIGURE 3 is a timing diagram helpful in understanding the operation of the subject invention considering the block diagram shown in FIGURE 1 and the timing means comprising an angular transducer as shown in FIGURE 2. Diagram a of FIGURE 3 shows one cycle of machine rotation corresponding to the drive motor 15 and angular positions every 60° are designated over the entire cycle. Thus, 360° would be considered one sewing cycle in which a complete switch has been made by the needle 11 contained in the sewing head 10. Diagram b is similar to diagram a with the exception that time has been substituted for angular position noting that at a machine rotation of 1200 R.P.M. 60° of rotation is traversed in 8.33 milliseconds. Diagram c is illustrative of the transducer output described with respect to FIGURE 2 and shows a pulse being generated at angular positions of 0°, 60°, 120° and 180° with no enabling pulses being generated over the second half of the cycle from 180° to 360°. Diagram d illustrates that three discrete steps can be made by the cloth frames 20 shown in FIGURE 1 per sewing cycle with each step being .025 inch in length. Note that the steps occur during the first half cycle whereas no movement of the cloth frame occurs during the second half cycle. Diagram e illustrates the position of the needle in the sewing head during a sewing cycle. More particularly, during the first half cycle (0–180°), the needle is out of the cloth whereupon the cloth frame 20 can be moved; however, in the second half cycle (180°–360°), the needle is in the cloth and the cloth frames are at rest. Finally, diagram F illustrates the action of the tape reader 40 shown in FIGURE 1 during one sewing cycle and during the first half cycle of operation, the tape is at rest and the tape reader feeds information into the X–Y logic circuit 38. When movement of the cloth frame ceases at 180° and the needle 11 enters the cloth, the tape reader advances a perforated tape one position during the interval between 180° and 300°.

Figure 4:
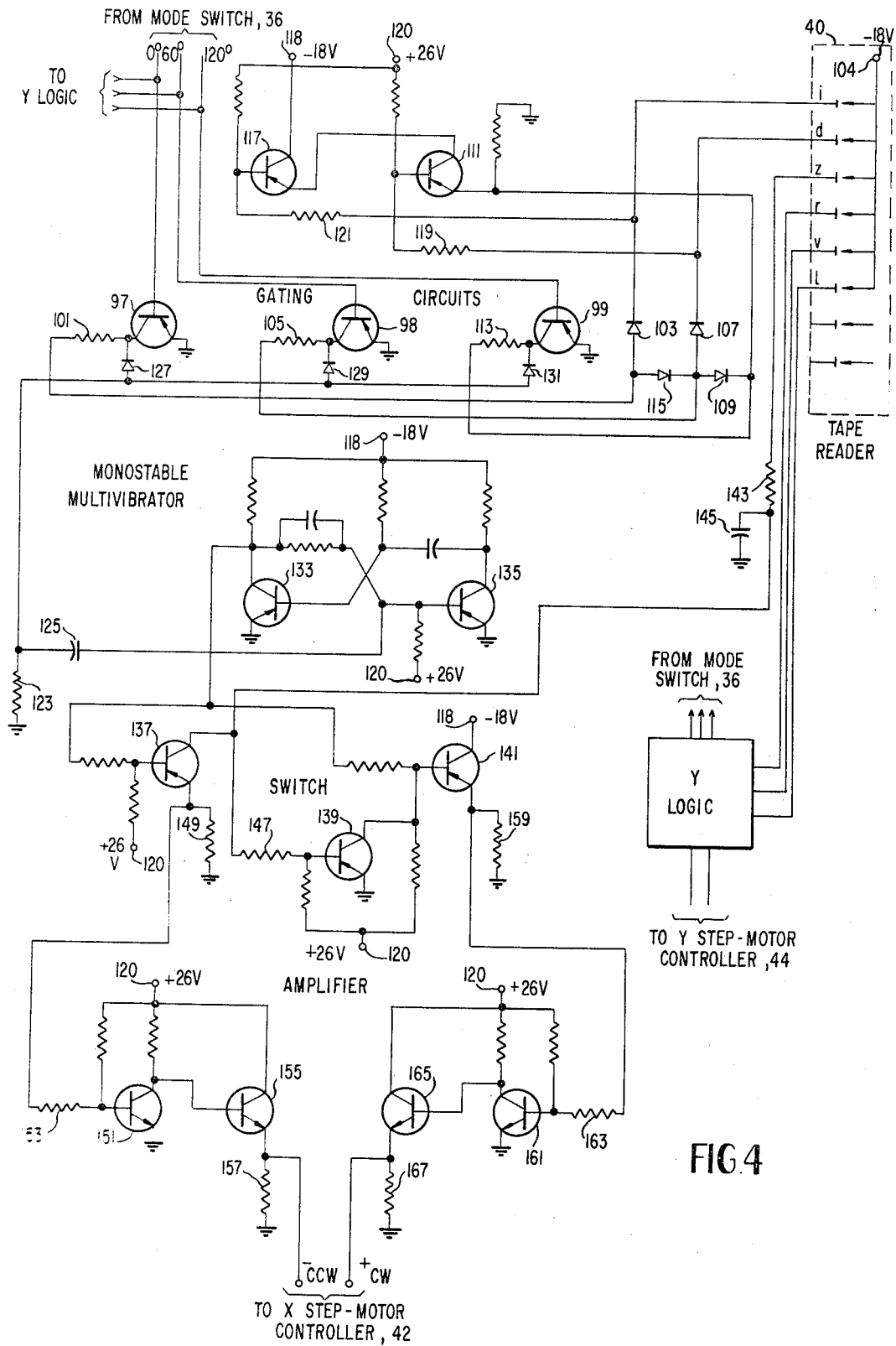
FIGURE 4 is an electronic schematic diagram of the X–Y logic circuitry shown in FIGURE 1.

Looking now to FIGURE 4 there is disclosed a partial schematic diagram of one embodiment of the X–Y logic circuit 38 shown in FIGURE 1. FIGURE 4 illustrates in detail the X logic portion of the logic circuitry, i.e., the circuitry used to generate the command signals for the step motor 22 which is used to move the cloth frame 20 along the X axis. The Y logic circuitry is similar in all respects as the X logic circuitry with the exception that the Y logic circuitry is coupled to the step motor 24 by means of the step motor controller 44.

Considering FIGURE 4 in greater detail, there is shown input leads from the mode switch 36 corresponding to 0°, 60°, and 120°. Each of these leads is simultaneously fed to both the X and Y logic portions. Considering the X logic only the 0° lead is fed to the base of a gate circuit comprising transistor 97. The 60° and 120° leads are respectively coupled to the bases of transistors 98 and 99 which also comprise gate circuits. The collector of transistor 97 is coupled to the i contact of the tape reader 40 by means of resistor 101 and diode 103. The contact i of the tape reader 40 is a brush contact and is adapted to read a tape, not shown, such that when a hole appears in the tape at the contact, the −18 volts applied to terminal 104 will be fed to the collector of transistor 97 through the diode 103 which is poled to conduct. Similarly, the collector of transistor 98 is coupled to tape reader contact d by means of resistor 105 and diode 107. The collector of transistor 99 is coupled to the cathode of diode 109 and the emitter of transistor 111 by means of resistor 113. Coupled between the anodes of diodes 103 and 107 is another diode 115. The collector of transistor 111 is directly connected to the emitter of transistor 117 which has its collector directly returned to a −18 voltage source applied to terminal 118. The base of transistor 111 is commonly coupled to the tape reader contact d and diode 107 by means of resistor 119. Also, the base of transistor 117 is coupled to tape reader contact i and diode 103 by means of resistor 121. The gating transistors 97, 98 and 99 have their collectors commonly connected to a differentiator circuit comprising resistor 123 and capacitor 125 by means of respective steering diodes 127, 129 and 131. The gating circuits are adapted to selectively feed trigger signals to the monostable multivibrator circuit comprising transistors 133 and 135.

The output of the monostable multivibrator is taken from the collector of transistor 133 and fed to a transistor switch circuit comprising transistors 137, 139 and 141. The switch circuit is also coupled to the tape reader contact z of tape reader 40 by means of the resistor 143 and capacitor 145. The resistor 143 is connected to the collector of transistor 137 and to the base of transistor 139 through resistor 147. The purpose of the switch circuit comprising transistors 137, 139 and 141 is to selectively steer the command signals for the step motor controller 42 to drive the step motor 22 in either a clockwise or counterclockwise direction in response to the sensed condition of the tape reader contact z. This action will be discussed in greater detail subsequently.

Continuing, the emitter of transistor 137 is coupled to ground by means of resistor 149 providing an emitter follower circuit thereby and a connection is made from the emitter thereof to the base of transistor 151 by means of resistor 153. Transistor 151 is adapted to amplify signals fed to the input thereof and the collector is connected to the base of transistor 155 which has its emitter 157 connected to ground to act as an emitter follower circuit. Likewise, the emitter of transistor 141 is coupled to ground by means of resistor 159. The emitter of transistor 141 is also coupled to the base of transistor 161 by means of resistor 163 which is adapted to act as an amplifier similar to transistor 151. The collector of transistor 161 is directly connected to the base of transistor 165 which has its emitter coupled to ground by means of resistor 167 acting as an emitter follower circuit in the same manner as transistor 155.

The operation of the X logic circuitry depends upon the information contained in a tape, not shown, fed between the tape reader contacts i through l. Assuming first that a hole appears in the tape under the read contact i only, −18 volts will be fed through diode 103 to the collector of gating transistor 97. It in turn will be rendered conductive whenever a negative potential is applied to its base. Since the base of transistor 97 is coupled to the −18 volts supply applied to terminal 86 (FIG. 2) by means of resistors 92 and 88, it will be rendered conductive. During one sewing cycle beginning with the point where the needle clears the cloth on the upward stroke which is the 0° point, the transducer 34 shown in FIG. 2 supplies a positive pulse to the base of transistor 97 turning it off. This occurs as a result of the action of the photoconductive element 60, the transistor 66 and the control switch 82 which provides a Schmitt trigger action and supplies a positive going squarewave with a fast rise time to the base of transistor 97. When transistor 97 is rendered nonconductive, a negative going pulse appears at the collector and is coupled to the differentiator circuit comprising resistor 123 and capacitor 125 by means of the diode 127. The negative going portion of the differentiated waveform triggers the monostable multivibrator comprising transistors 133, 135 causing a pulse to be fed to the switch circuit comprised of transistors 137, 139 and 141. As the cycle continues through 60° and 120°, the gating circuits comprising transistors 98 and 99 will not be triggered inasmuch as no collector voltage is supplied thereto but only to transistor 97.

The reader contact z, as noted above, in the tape reader determines whether the pulse fed to the switch circuit will drive the step motor in a clockwise (+) or counterclockwise (−) direction. In the situation where the tape positioned during the instant sewing cycle has no hole under the contact z, −18 volts at terminal 104 does not appear at the collector of transistor 137 nor at the base of transistor 139; therefore, neither are able to conduct; however, the multivibrator output is coupled to transistor 141 which translates the pulse to transistor 161. The pulse is amplified and inverted by transistor 161 and coupled to the clockwise (CW) terminal of the motor controller 42. When a hole appears under the lead contact z, −18 volts is applied to the collector of transistor 137 and through resistor 147 to the base of transistor 139. Transistor 137 then conducts grounding the base of transistor 141 which blocks the multivibrator pulse from being gated through transistor 141. Transistor 137 meanwhile amplifies the multivibrator pulse and passes it to transistor amplifier 151 which couples it to the counterclockwise (CCW) terminal of the motor controller 42 by means of the emitter follower 155.

In the aforementioned condition, only a hole appeared under contact i and the step motor controller 42 receives only one pulse and the cloth frame 20 is driven only one step during the sewing cycle inasmuch as at the 60° and 120° points, the gating circuits comprising transistors 98 and 99 were inoperative due to lack of collector supply voltage. When the angular transducer reaches the 180° position, a positive pulse appears at the lead 95 which is coupled to the tape controller 46 which advances the tape one step for the next sewing cycle.

In the next sewing cycle, consider that the tape blocks contact i but a hole appears under contact d only. In this condition, −18 volts applied to terminal 104 would be fed through contact d to the collector of transistor 98 by means of diode 107 and also to the collector of transistor 97 by means of the diode 115. Gating signals would then be coupled to the monostable multivibrator then at both the 0° and 60° positions, making a total of two steps for the instant cycle. No step occurs at the 120° position because no voltage is applied to the collector of transistor 99. Again, at the 180° point, the tape reader receives a pulse from the silicon controlled switch 85 and the tape reader will advance to the next cycle. In the third cycle, assuming both $d$, $i$, and $z$ contacts sense a hole in the tape, the −18 volts is applied not only to transistors 97 and 98 but also to transistor 99 by means of the action of transistors 117 and 111 which conduct only when both contacts $i$ and $d$ sense holes simultaneously. Under this condition, three gating pulses are coupled to the monostable multivibrator, one each at 0°, 60° and 120° with respective command pulses being coupled to the step motor controller 42 ordering the motor to take three steps during the cycle. This is what has been described with respect to the time diagram shown in FIGURE 3.

As stated earlier, the Y logic operates identical to the X logic circuitry explained above; however, it receives inputs from the tape reader by means of contacts $r$, $v$ and $l$ in the same manner as contacts $i$, $d$ and $z$ with respect to the X logic.

Figure 5:
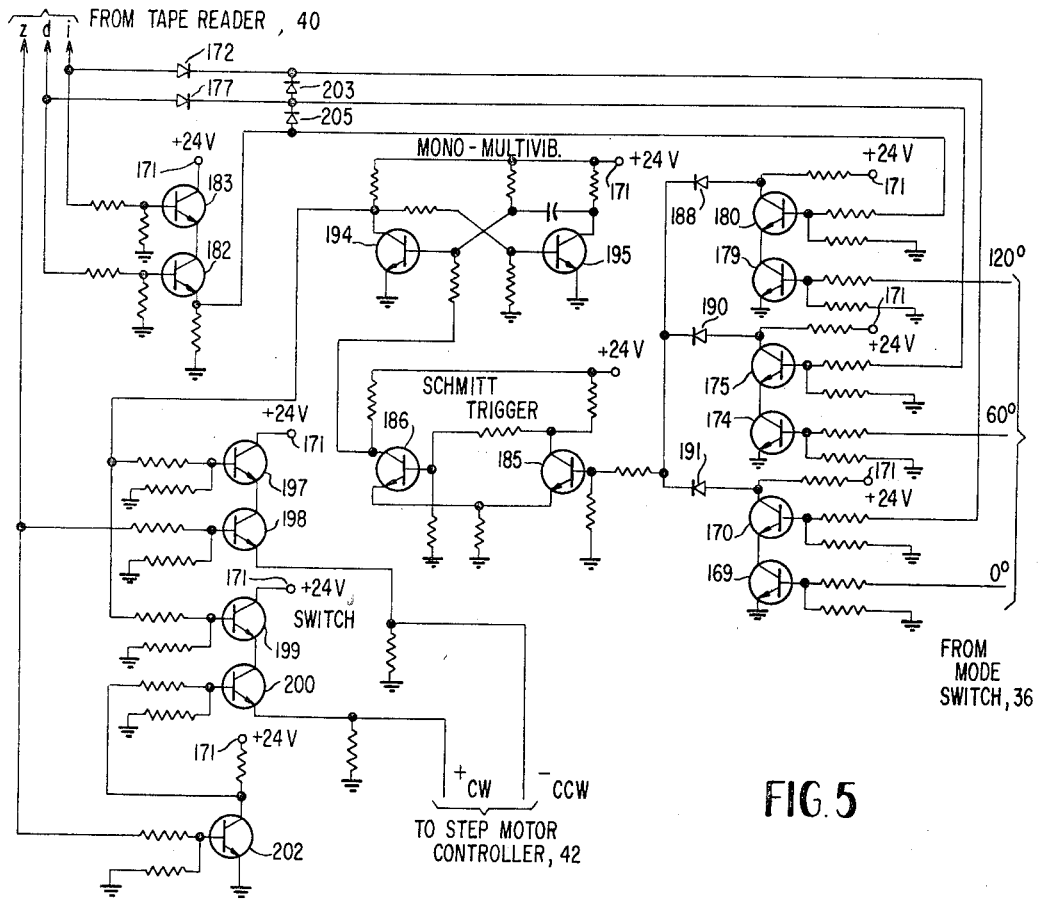
FIGURE 5 is an electronic schematic diagram of a second embodiment of the X–Y logic circuitry.

FIGURE 5 discloses a second and preferred embodiment of the X or Y logic circuit such as shown in FIGURE 4. Again only the logic for one of the axes is illustrated, in this instance, the X axis. For the proper operation of the circuitry in FIGURE 5, the contact voltage applied to the reader contacts must be connected to a positive voltage (+26 v.) as opposed to the −18 volts as shown in FIGURE 4.

The configuration shown in FIGURE 5 is primarily comprised of a plurality of AND gates. The first AND gate comprises transistors 169 and 170 which are coupled together such that the emitter of transistor 170 is directly connected to the collector of transistor 169. The emitter of transistor 169 is connected to ground while the collector of transistor 170 is coupled to a positive potential source (+24 v.) at terminal 171. In order for current to exist, inputs must simultaneously be placed at the bases of transistors 169 and 170, hence giving the operation of an AND logic gate. The 0° input from the mode switch 36 is coupled to the base of transistor 169 while the $i$ reader contact is coupled to the base of transistor 170 by means of diode 172. A second AND gate is comprised of transistors 174 and 175. The base of transistor 174 is coupled to the 60° line from mode switch 36 while the base of transistor 175 is coupled to the $d$ reader contact by means of diode 177. Still a third AND gate comprised of transistors 179 and 180 have their bases respectively coupled to the 120° line and to the emitter of transistor 182 which is part of a fourth AND gate including transistor 183. The base of transistor 182 is connected to the $d$ reader contact while the base of transistor 183 is coupled to the $i$ reader contact. The first, second and third AND gates are coupled to a Schmitt trigger circuit comprising transistors 185 and 186 by means of respective diodes 188, 190 and 191. The Schmitt trigger is coupled to a monostable multivibrator comprising transistors 194 and 195.

The output of the monostable multivibrator is then coupled to a switch circuit comprised of a fifth and sixth AND gate comprising transistors 197, 198 and 199 and 200 respectively. The switch circuit also includes transistor 202 which has its base coupled to the $z$ reader contact. Also, the base of transistor 198 is coupled to the $z$ reader contact. The output of the monostable multivibrator is commonly coupled to the bases of transistors 197 and 199, respectively.

In operation, when the tape reader senses a hole only under reader contact $i$, a positive potential is fed only to the base of transistor 170 forming part of the AND gate with transistor 169 which, when the transducer translates a positive pulse at the 0° angular position, a signal is transmitted to the Schmitt trigger circuit comprising transistors 185 and 186 by means of the diode 191 which then triggers the multivibrator sending a command pulse to the switch circuit comprising the fifth and sixth AND gates including transistors 197 through 202. In the instance where only the $d$ reader contact senses a hole in the tape, a positive potential is directed to both the base of transistor 175 and the base of transistor 170 due to the action of diode 203. In this case, when signals appear at the bases of transistors 169 and 174 at the 0° and 60° points, respectively, two separate signals are coupled to the Schmitt trigger circuit. Again, where both tape reader contacts $i$ and $d$ sense positive voltage, the fourth AND gate comprising transistors 182 and 183 is activated and a positive potential is adapted to be coupled to the bases of transistors 180, 175 and 170 through the diodes 203 and 205. In this instance, as the transducer provides inputs at 0°, 60° and 120° to the transistors 169, 174 and 179, respectively, three separate signals will be translated to the Schmitt trigger circuit, giving three distinct steps during a sewing cycle.

With regard to the direction in which the step motor is driven, the $z$ reader contact when it does not sense a positive voltage provides no input to the bases of transistors 198 and 202 and therefore the AND circuit comprising transistors 197 and 198 is rendered inoperative and transistor 202 is held and non-conductive. However, the +24 volts appearing at the collector of transistor 202 is coupled to the base of transistor 200 which when transistor 199 receives a positive pulse from the monostable multivibrator will couple a signal to the counterclockwise terminal of the step motor controller 42. When the $z$ reader contact does sense a positive voltage, transistor 202 is rendered conductive which removes the base voltage from transistor 200 and therefore the AND gate comprising transistors 199 and 200 is rendered non-operative. On the other hand, the base of transistor 198 has a positive potential which when the monostable multivibrator output is applied to transistor 197 a command signal will be coupled to the counterclockwise terminal of the motor controller 42.

Figure 6:
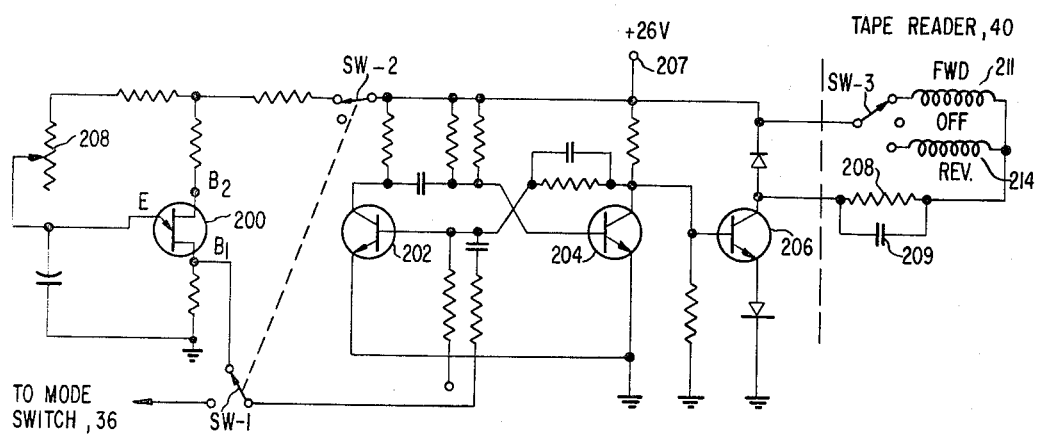
FIGURE 6 is an electronic schematic diagram illustrative of the tape reader controller utilized in the subject invention and illustrated in FIGURE 1.

FIGURE 6 is illustrative of a circuit embodying the tape reader controller 46 shown in FIGURE 1. Shown therein is a unijunction transistor oscillator circuit including a unijunction transistor 200, a monostable multivibrator including transistors 202 and 204 and a driver amplifier including transistor 206. The unijunction oscillator is a free-running oscillator and is coupled to a positive suply source (+26 volts) by means of switch SW–2 shown in the closed position when the oscillator is adapted to be operative. A variable resistor 208 is coupled to the emitter of the unijunction transistor for providing a frequency control of the oscillator output signal which is coupled to switch SW–1 from its base $B_1$. Switch SW–1 and switch SW–2 are mechanically ganged together and are shown in a TEST position. The purpose of the TEST position is to test the tape reader operation in absence of signals from the angular transducer 36 which may be either in a stand-by or an off condition. Switch SW–1 is also coupled to the mode switch 36 so that the switch SW–1 is adapted to feed a signal either from the unijunction oscillator in the TEST position or the mode switch 36 when in the OPERATE position to the free-running multivibrator circuit comprising transistors 202 and 204. The output of the monostable multivibrator is taken from the collector of transistor 204 and fed to the 206 is coupled to the supply voltage (+26 volts) applied base of transistor 206. The collector of transistor amplifier to terminal 207 by means of the parallel combination of resistor 208 and capacitor 209 in series with either a forward winding 211 or the reverse winding 214 of the tape reader drive motor as selected by the switch SW–3 which is coupled to the supply voltage. The middle position of SW–3 is an OFF position for the tape reader motor.

When in the OPERATE condition, the angular transducer enabling signal corresponding to 180° angular position is coupled by means of switch SW–1 to the monostable multivibrator which generates a drive pulse for the transistor 206 which becomes conductive in accordance with the pulse coupled thereto and since the motor windings 211 and 214 form part of the load circuit thereof depending upon the switch position of SW-3, the tape reader will advance each time the transistor 206 is rendered conductive. When the switch SW-1 is in the TEST position as shown, the monostable multivibrator is controlled by the unijunction oscillator circuit to step the tape reader, the switch SW-1 will feed control pulses to the monostable multivibrator which then drives the tape reader 40 as previously explained with respect to the operation of transistor 206.

What has been shown and described, therefore, is a high speed digital electronic control for sewing and other applications where it is desirable to have a recorded predetermined motion along both X and Y axes. Furthermore, the present invention provides a means whereby incremental motion in both directions along the X and Y axes can be made over a controlled portion of the cycle where the duration of the cycle is extremely short considering mechanical movement. More particularly, the present invention provides a means whereby automated sewing or embroidering can be accomplished at relatively high speeds while obviating the need for highly skilled personnel heretofore required.

While the invention has been particularly shown and described with reference to a preferred embodiment thereof, it will be understood by those skilled in the art that various changes in the form and details may be made therein, without departing from the spirit and scope of the invention.

We claim as our invention:

1. An electronic control system for automated sewing machine apparatus and the like comprising, in combination: at least one sewing head; first motor means including a drive shaft coupled to said at least one sewing head for operating said sewing head; timing means coupled to said drive shaft for providing a plurality of enabling signals in accordance with the angular position of said drive shaft; a frame adapted to hold fabric under tension for operation thereon by said sewing head and operable to move in predetermined directions with respect to said sewing head; second motor means coupled to said frame for moving said frame in response to command signals applied thereto; programmer means, adapted to produce control signals for said control system, coupled to said timing means for receiving one enabling signal of said plurality of enabling signals at a selected angular position for energization of said programmer means; and logic circuit means coupled to said timing means and said programmer means for generating said command signals applied to said second motor means in response to said control signals and the other enabling signals of said plurality of enabling signals to selectively move said frame in said predetermined directions during a selected portion of a revolution of said drive shaft.

2. The invention as defined in claim 1, wherein said second motor means comprises step motor means for moving said frame in steps of predetermined distances in coordinate directions in response to said command signals.

3. The invention as defined in claim 1, wherein said second motor means comprises a first and a second step motor and additionally including mechanical amplifier means coupling said first and second step motor to said frame for moving said frame in rectangular coordinate directions, said first step motor causing movement of said frame in one coordinate direction and the second step motor causing movement of said frame in the other rectangular coordinate direction.

4. An electronic control system for automated sewing machine apparatus and the like comprising in combination: at least one sewing head; drive motor means including a drive shaft coupled to said at least one sewing head for operating said sewing head; angular transducer means coupled to said drive shaft for providing an enabling signal at selected angular positions of said drive shaft during a selected portion of a cycle of revolution of said drive shaft; a frame adapted to hold fabric under tension for operation thereon by said sewing head and operable to move in an X and a Y rectangular coordinate direction with respect to said sewing head; step motor means coupled to said frame for moving said frame in said X and Y coordinate directions in accordance with command signals applied thereto; programmer means, adapted to feed control signals to said control system, coupled to said timing means for receiving an enabling signal at a selected angular position for energization of said programming means; and logic circuit means coupled to said timing means and said programmer means for generating said command signals applied to said step motor means in response to said control signals and the other enabling signals provided by said angular transducer means for selectively moving said frame in said X and Y coordinate directions at said other angular positions of said drive shaft.

5. The invention as defined in claim 4, wherein said step motor means comprises a first step motor coupled to said frame for moving said frame in the X coordinate direction, and a second step motor coupled to said frame for moving said frame in the Y coordinate direction.

6. The invention as defined in claim 4, wherein said angular transducer means comprises photoelectric means selectively energized in response to one-half cycle of revolution of said drive shaft for providing enabling signals only during said one-half cycle of revolution.

7. The invention as defined in claim 4, wherein said programmer means comprises a record tape reader.

8. The invention as defined in claim 4, wherein said logic circuit means comprises a separate circuit for each coordinate direction of frame movement, each circuit comprising gating means coupled to said angular transducer means and being selectively responsive to said enabling signals for accepting said control signals from said programmer means, pulse forming means coupled to said gating circuit for generating said command signals in response to said enabling signals and said control signals; and switch means coupled to said pulse forming means and said programmer means for translating said command signals to said second motor means in a selected polarity sense for desired movement in said X and Y coordinate directions.

9. The invention as defined in claim 4, wherein said second motor means comprises a first and a second step motor for moving said frame in an X and a Y rectangular coordinate direction, respectively, step motor controller means coupled to said first and second step motor means for driving said step motor means in a forward and backward direction in accordance with command signals applied thereto from said logic circuit means.

10. The invention as defined in claim 9 and additionally including mechanical amplifier means coupling said first and said second step motor to said frame.

11. The invention as defined in claim 4, wherein said logic circuit means comprises an X logic circuit and a Y logic circuit, said X and Y logic circuits each comprising gate circuit means coupled to said angular transducer means and said programmer means, being responsive to said enabling signals and said control signals at preselected angular positions of said drive shaft to produce a command signal, and switch means coupled to said gating circuit means for coupling said common signals to said step motor means in a predetermined polarity sense for operating said motor means in accordance with the desired movement as determined by said programmer means.

12. The invention as defined in claim 11 wherein said gate circuit means and said switch means are comprised of AND gates.

13. An electronic control system for automatic sewing machine apparatus or the like comprising in combination: sewing machine apparatus including at least one sewing head; drive motor means including a drive shaft coupled to said at least one sewing head for operation thereof; an angular transducer coupled to said drive shaft for providing an enabling signal at selected angular positions for 180° of a complete revolution of said drive shaft; a work frame adapted to hold fabric under tension for operation thereon by said sewing head and being operable to move in an X and a Y rectangular coordinate direction with respect to said sewing head; a first and a second step motor coupled to said work frame for moving said frame in a forward and backward direction along said X and Y coordinate directions in accordance with command signals applied thereto; a perforated tape reader including controller means coupled to said angular transducer for receiving an enabling signal at a selected angular position for indexing said tape reader to feed control signals to said electronic control system for operating said first and said second step motors; and an X and a Y logic circuit coupled to said timing means and said perforated tape reader for generating said command signals applied to said first and second step motors in response to said control signals and the remainder of said enabling signals from said angular transducer to move said frame backwards and forwards in said X and Y coordinate directions at the respective angular positions of said drive shaft which generates said other enabling signals to effect movement of said work frames in steps of predetermined distances in the X and Y coordinate directions during said 180° of said cycle of rotation of said drive shaft, the other 180° of rotation of said drive shaft being a time wherein work frame motion is deactivated and a sewing operation by said sewing head is initiated.

References Cited

UNITED STATES PATENTS

| | | | |
|---|---|---|---|
| 2,837,046 | 6/1958 | Carson et al. | 112—102 XR |
| 3,029,758 | 4/1962 | Hurme et al. | 112—2 |
| 3,083,580 | 4/1963 | Carson et al. | 112—84 XR |
| 3,208,414 | 9/1965 | Reeber et al. | 112—102 XR |
| 3,329,109 | 7/1967 | Portnoff et al. | 12—102 XR |

JORDAN FRANKLIN, *Primary Examiner.*

J. R. BOLER, *Examiner.*